US010042541B2

(12) United States Patent
Sutou et al.

(10) Patent No.: US 10,042,541 B2
(45) Date of Patent: Aug. 7, 2018

(54) INFORMATION PROCESSING APPARATUS AND INFORMATION PROCESSING METHOD FOR UTILIZING VARIOUS CROSS-SECTIONAL TYPES OF USER INPUT

(71) Applicant: Sony Corporation, Minato-ku (JP)

(72) Inventors: Yasuhiro Sutou, Tokyo (JP); Hiroaki Kitano, Saitama (JP); Midori Kawano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 265 days.

(21) Appl. No.: 14/320,752

(22) Filed: Jul. 1, 2014

(65) Prior Publication Data
US 2015/0046860 A1    Feb. 12, 2015

(30) Foreign Application Priority Data

Aug. 6, 2013 (JP) .................................. 2013-163350

(51) Int. Cl.
*G06F 3/0486*    (2013.01)
(52) U.S. Cl.
CPC ................................. *G06F 3/0486* (2013.01)
(58) Field of Classification Search
CPC ............................. G06Q 20/123; G06F 3/048
USPC ........................................................ 715/769
See application file for complete search history.

(56) References Cited

U.S. PATENT DOCUMENTS 5,819,263 A * 10/1998 Bromley ................ G06Q 10/10
705/3
6,282,175 B1 * 8/2001 Steele .................. G06F 11/0709
370/254
6,304,864 B1 * 10/2001 Liddy ............... G06F 17/30867
706/15
8,185,558 B1 * 5/2012 Narayanan ........ G06F 17/30958
707/798
8,762,879 B1 * 6/2014 Goodger ........... G06F 17/30899
715/738
9,098,584 B1 * 8/2015 Fredinburg ....... G06F 17/30864
(Continued)

FOREIGN PATENT DOCUMENTS

CN    200810220008 A  * 12/2008
JP    2012-243033 A    12/2012

OTHER PUBLICATIONS

Soon, Patrick "The Magic of Reverse Image Searches" Feb 12, 2013 ABA Section of Litigation.*

(Continued)

*Primary Examiner* — Abdullah Al Kawsar
*Assistant Examiner* — Sean Hsiao
(74) *Attorney, Agent, or Firm* — Oblon, McClelland, Maier & Neustadt, L.L.P.

(57) ABSTRACT

There is provided an information processing apparatus including a processor configured to cause a display to show a screen, the screen including an input area which accepts a text input or a drag & drop input performed by a user, a first icon which is associated with the input area and executes a first operation based on an input accepted by the input area, a second icon which is associated with the input area and executes a second operation based on an input accepted by the input area, the second operation being different from the first operation, a first display area for information acquired by the first operation, and a second display area for information acquired by the second operation.

17 Claims, 11 Drawing Sheets

(56) References Cited

U.S. PATENT DOCUMENTS

| | | | | |
|---|---|---|---|---|
| 2003/0069931 | A1* | 4/2003 | Omura | G06F 3/0481 709/205 |
| 2004/0263529 | A1* | 12/2004 | Okada | G11B 27/034 345/619 |
| 2005/0097089 | A1* | 5/2005 | Nielsen | G06F 17/30967 |
| 2005/0262054 | A1* | 11/2005 | Nurmi | G06F 17/30867 707/3 |
| 2007/0162856 | A1* | 7/2007 | Schlossberg | G06Q 30/00 715/730 |
| 2007/0172155 | A1* | 7/2007 | Guckenberger | G06F 17/30247 382/305 |
| 2007/0186189 | A1* | 8/2007 | Schiller | G06F 17/30274 715/838 |
| 2007/0209025 | A1* | 9/2007 | Jing | G06F 17/30265 715/968 |
| 2007/0244925 | A1* | 10/2007 | Albouze | G06F 17/30265 |
| 2008/0002916 | A1* | 1/2008 | Vincent | G06K 9/3258 382/305 |
| 2008/0072179 | A1* | 3/2008 | Anwar | G06F 17/30864 715/856 |
| 2008/0130960 | A1* | 6/2008 | Yagnik | G06F 17/30247 382/118 |
| 2008/0154869 | A1* | 6/2008 | Leclercq | G06F 17/30973 |
| 2010/0030578 | A1* | 2/2010 | Siddique | G06Q 10/0637 705/3 |
| 2010/0082585 | A1* | 4/2010 | Barsook | G06F 17/3079 707/706 |
| 2011/0010641 | A1* | 1/2011 | Wolff | G06Q 10/107 715/753 |
| 2011/0128288 | A1* | 6/2011 | Petrou | G06F 17/30047 345/428 |
| 2011/0196933 | A1* | 8/2011 | Jackson | G06Q 10/107 709/206 |
| 2011/0196935 | A1* | 8/2011 | Rideout | G06Q 10/107 709/206 |
| 2012/0059810 | A1* | 3/2012 | Sejnoha | G06F 17/30976 707/706 |
| 2012/0134590 | A1* | 5/2012 | Petrou | G06F 17/30253 382/182 |
| 2012/0173566 | A1* | 7/2012 | D'Angelo | G06F 17/30654 707/769 |
| 2012/0173992 | A1* | 7/2012 | D'Angelo | G06F 17/30654 715/751 |
| 2012/0179716 | A1* | 7/2012 | Takami | G06F 17/30247 707/771 |
| 2012/0296931 | A1* | 11/2012 | Fujita | G06F 17/30646 707/769 |
| 2013/0236119 | A1* | 9/2013 | Campbell | G06T 11/60 382/284 |
| 2014/0046935 | A1* | 2/2014 | Bengio | G06F 17/30277 707/723 |
| 2014/0181215 | A1* | 6/2014 | Omoko | H04L 51/046 709/206 |
| 2014/0282772 | A1* | 9/2014 | Chen | H04N 21/26258 725/97 |
| 2015/0127748 | A1* | 5/2015 | Buryak | G06F 17/30867 709/206 |
| 2015/0169067 | A1* | 6/2015 | Hong | G06F 3/04842 715/863 |
| 2015/0169636 | A1* | 6/2015 | Ovsjanikovs | G06F 17/30256 707/722 |
| 2016/0004761 | A1* | 1/2016 | Zhang | G06Q 10/10 707/740 |

OTHER PUBLICATIONS

Patrick Soon The Magic of Reverse Image Searches, published on Feb. 2013, http://apps.americanbar.org/litigation/committees/technology/articles/winter2013-0213-magic-reverse-image-searches.html (available before Jun. 28, 2016).*

Yakuza, "Clear input fields on form submit", published on Mar. 11, 2013, https://stackoverflow.com/questions/15343890/clear-input-fields-on-form-submit.*

Gusiev, "Clear upload file input field", published on Apr. 23, 2009, http://gusiev.com/2009/04/clear-upload-file-input-field/.*

* cited by examiner

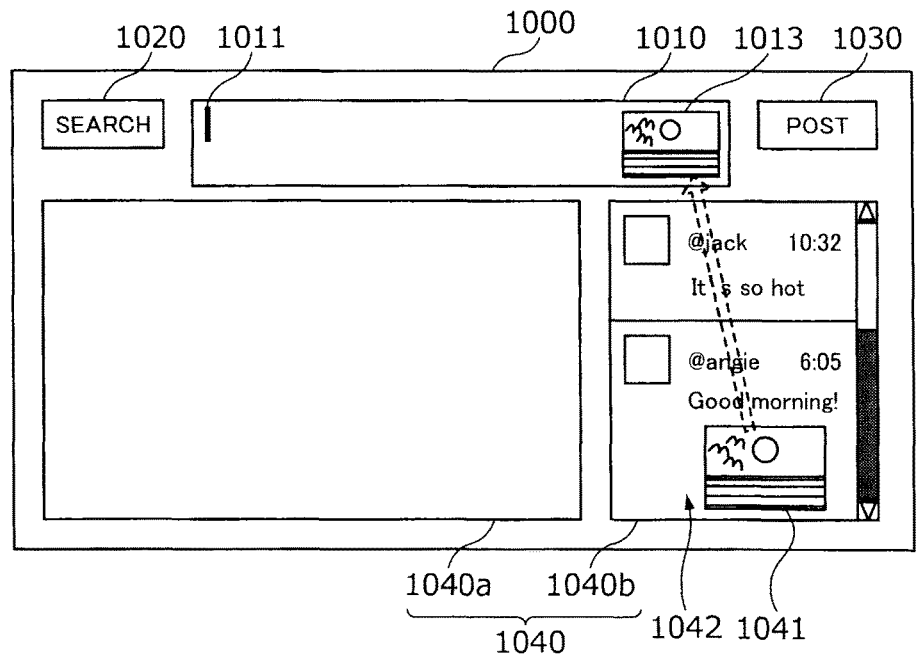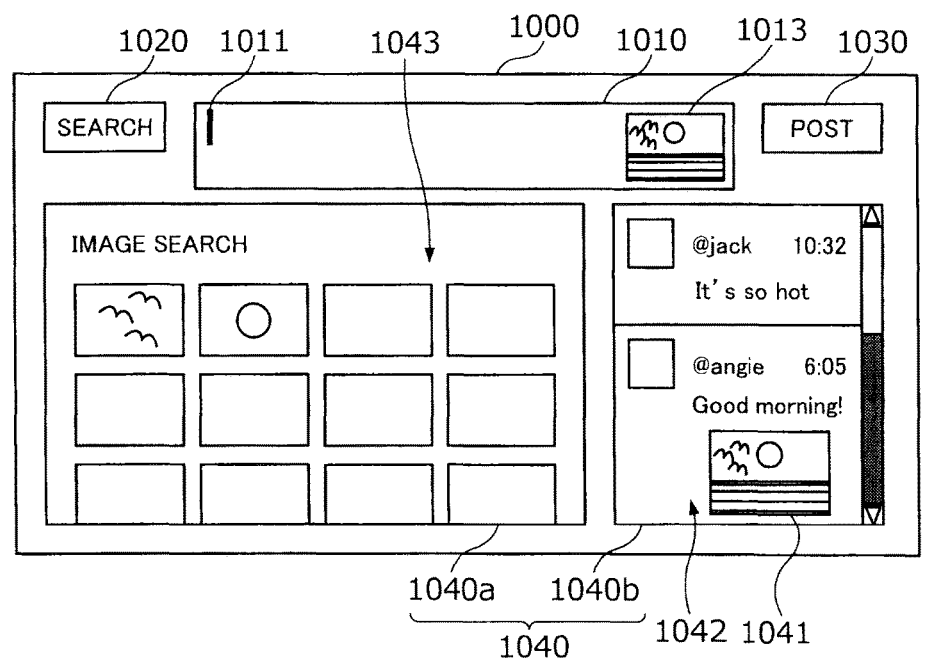

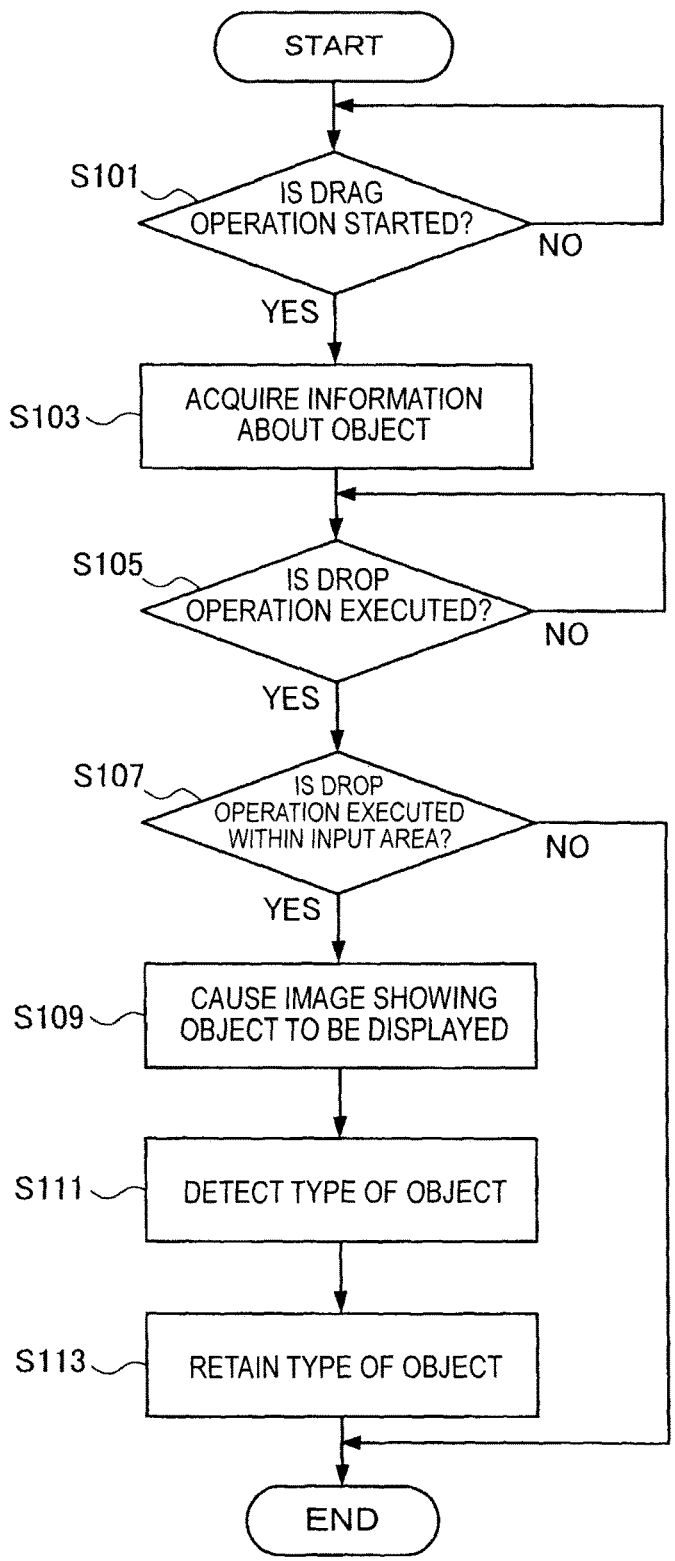

INFORMATION PROCESSING APPARATUS AND INFORMATION PROCESSING METHOD FOR UTILIZING VARIOUS CROSS-SECTIONAL TYPES OF USER INPUT

CROSS REFERENCE TO RELATED APPLICATIONS

This application claims the benefit of Japanese Priority Patent Application JP 2013-163350 filed Aug. 6, 2013, the entire contents of which are incorporated herein by reference.

BACKGROUND

The present disclosure relates to an information processing apparatus and an information processing method.

Users' activities using information processing apparatuses such as tablets, smartphones, and personal computers (PC's) have recently been diversified. For example, a user searches and views various pieces of information on a network. Further, for example, a user sends information to or shares information with other users on a network through social media or the like. The information sent or shared in this way may become one of targets to be searched for other users. For such a case, JP 2012-243033A discloses technology for searching for and showing information that a user is particularly interested in from among pieces of information shared in social media, for example.

SUMMARY

However, the technology written in JP 2012-243033A or the like only enhances the efficiency of the single activity of information search, for example, and does not comply with the above-mentioned activity diversification. There is no sufficient technology that complies with the activity diversification of users yet, such as technology for making it easier for the users to utilize cross-sectionally various types of activities.

In light of the foregoing, it is desirable to provide an information processing apparatus and an information processing method which are novel and improved, and which are capable of providing a user interface that makes it easier for a user to utilize cross-sectionally information acquired through a plurality of operations performed by the information processing apparatus.

According to an embodiment of the present disclosure, there is provided an information processing apparatus which includes a processor configured to cause a display to show a screen, the screen including an input area which accepts a text input or a drag & drop input performed by a user, a first icon which is associated with the input area and executes a first operation based on an input accepted by the input area, a second icon which is associated with the input area and executes a second operation based on an input accepted by the input area, the second operation being different from the first operation, a first display area for information acquired by the first operation, and a second display area for information acquired by the second operation.

According to another embodiment of the present disclosure, there is provided an information processing method performed by a processor, the method including causing a display to show a screen, the screen including an input area which accepts a text input or a drag & drop input performed by a user, a first icon which is associated with the input area and executes a first operation based on an input accepted by the input area, a second icon which is associated with the input area and executes a second operation based on an input accepted by the input area, the second operation being different from the first operation, a first display area for information acquired by the first operation, and a second display area for information acquired by the second operation.

According to one or more of embodiments of the present disclosure, there can be provided the user interface that makes it easier for a user to utilize cross-sectionally information acquired through a plurality of operations performed by the information processing apparatus.

BRIEF DESCRIPTION OF THE DRAWINGS

FIG. 5 is a diagram illustrating a use case according to the first embodiment of the present disclosure;

FIG. 6 is a diagram illustrating a use case according to the first embodiment of the present disclosure;

FIG. 14 is a flowchart showing an example of processing performed by a browser function 124 at a time of executing a drag & drop operation in a third embodiment of the present disclosure;

DETAILED DESCRIPTION OF THE EMBODIMENT(S)

Figure 1:
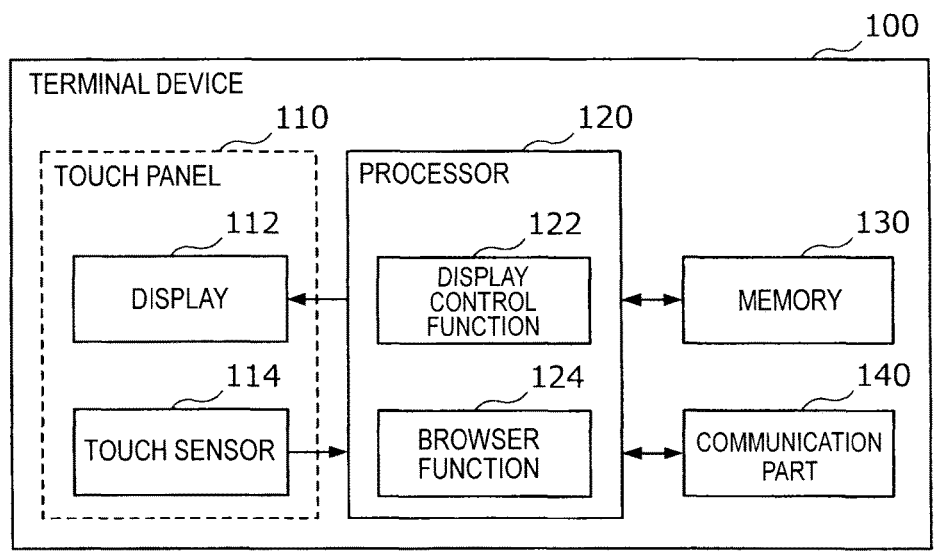
FIG. 1 is a block diagram showing a schematic functional configuration of a terminal device according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. First embodiment
1-1. Functional configuration
1-2. Screen display example
1-3. Use case
2. Second embodiment
3. Third embodiment
4. Fourth embodiment
5. Supplement

1. First Embodiment

1-1. Functional Configuration

FIG. 1 is a block diagram showing a schematic functional configuration of a terminal device according to a first embodiment of the present disclosure. A terminal device 100 shown in FIG. 1 may be any device in which a user can browse information through an image shown on a display, such as a smartphone, a tablet, various types of PC's, a media player, a game console, or a TV. The terminal device 100 includes a touch panel 110, a processor 120, memory 130, and a communication part 140. The touch panel 110 includes a display 112 and a touch sensor 114. The processor 120 operates in accordance with a program stored at least temporarily in the memory 130, and thus achieves functions including a display control function 122 and a browser function 124. Hereinafter, the functional configuration will be further described.

The display 112 can be achieved by a liquid crystal display (LCD), an organic electro-luminescence (EL) display, or the like, and displays an image in accordance with a control performed by the processor 120. The touch sensor 114 is achieved by a sensor of an electrostatic capacity-type or the like disposed on a surface of the display 112, and detects a user's contact on the surface of the display 112. Note that the terminal device 100 may include an input means such as a mouse, a keyboard, a touch pad, or a button, in addition to or instead of the touch sensor 114.

The display control function 122 controls the display 112 in a manner that the display control function 122 causes the display 112 to display an image showing pieces of information. For example, the display control function 122 causes the display 112 to display a graphical user interface (GUI) image in accordance with a program stored in the memory 130. The GUI image includes, for example, an input area for accepting a user's input using an input means such as the touch sensor 114, and an icon for causing the browser function 124 to execute a given operation. Further, for example, the display control function 122 causes information acquired by the browser function 124 to be displayed in a given display area set by the display 112.

The browser function 124 accesses a server on a network through the communication part 140, and acquires pieces of information. To be more specific, for example, the browser function 124 provides a function of a web browser. The browser function 124 transmits a request including information that is input by the user to the server by using an input means such as the touch sensor 114, and receives information as a response to the request from the server. The browser function 124 acquires information by utilizing services provided by the server. For example, the browser function 124 acquires information by utilizing a search service. In this case, the information that is input by the user may be utilized as a search condition. Further, for example, the browser function 124 acquires information by utilizing social media. In this case, the information that is input by the user may be utilized as a comment posted on social media.

The memory 130 can be achieved by, for example, a semiconductor memory used as random access memory (RAM) or read only memory (ROM), a storage device utilizing a magnetic disk such as a hard disk drive (HDD), an optical disc, or a magneto-optical disk, flash memory, or a removable medium. The memory 130 stores at least temporarily a program used for the processor 120 to operate. For example, the program may be stored continuously in the memory 130, or may be downloaded from a server on a network through the communication part 140 and may be stored temporarily. Further, the memory 130 may store at least temporarily data generated by the display control function 122 and the browser function 124 achieved by the processor 120.

The communication part 140 is achieved by wired or wireless communication circuits, and executes network communication in accordance with the control performed by the processor 120. The communication part 140 executes the network communication in accordance with a communication standard of the Internet, a local area network (LAN), or Bluetooth (registered trademark). As described above, the communication part 140 is utilized by the browser function 124 achieved by the processor 120, for example, and transmits and receives pieces of information to and from a server on a network.

1-2. Screen Display Example

Figure 2:
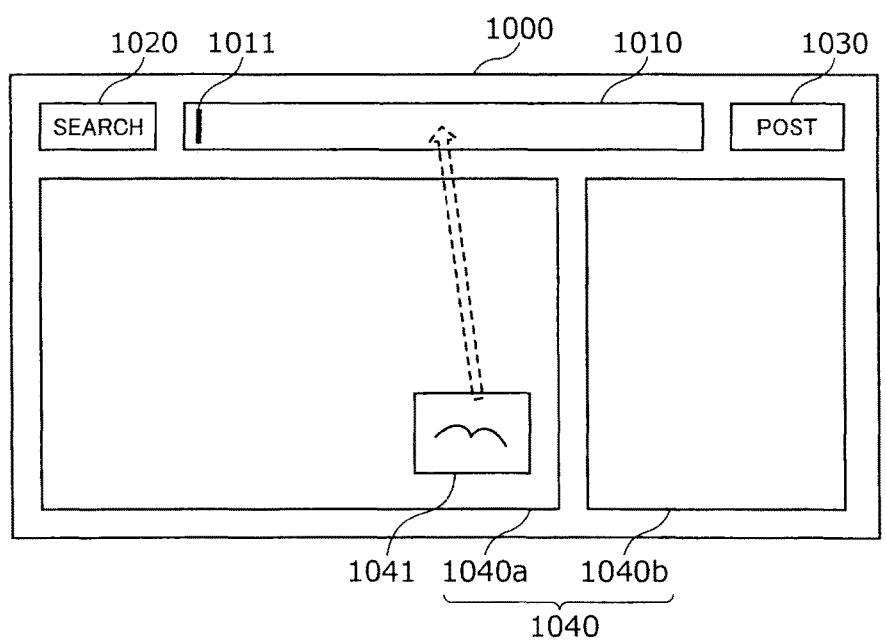
FIG. 2 is a diagram showing an example of a screen shown on a display in the first embodiment of the present disclosure.

FIG. 2 is a diagram showing an example of a screen shown on a display in the first embodiment of the present disclosure. Referring to FIG. 2, a screen 1000 shown on the display 112 of the terminal device 100 includes an input area 1010, a search button 1020, a post button 1030, and an information display area 1040. Hereinafter, each of display elements will be further described.

(Input Area)

The input area 1010 accepts a text input or a drag & drop input performed by a user. In the input area 1010, a text that is input through the text input and/or an object that is input through the drag & drop input are/is displayed. The object may be displayed as an icon or a reduced image, for example.

Here, the text input may be acquired, in the terminal device 100, through a virtual keyboard displayed on the display 112 separately from the screen 1000 or a keyboard provided as an input means. For example, when the user executes the text input in the state where a cursor 1011 is displayed in the input area 1010, for example, the text input to the input area 1010 is accepted.

Further, the drag & drop input may be acquired, in the terminal device 100, through an operation of moving an object such as an image displayed on the display 112 from one position to another position by using the touch sensor 114 or a mouse. For example, in the case of using the touch sensor 114, a drag operation is executed when a touch position is moved while a touch operation on the object displayed on the display 112 is continued, and a dropping is executed when the touch operation is released. FIG. 2 shows, as an example, the drag & drop input of an image 1041 displayed in the information display area 1040 to the input area 1010.

Note that the input area 1010 may further accept, successively to the text input or drag & drop input, another text input or drag & drop input. For example, the input area 1010 may accept both the text input and the drag & drop input which are successive to each other. Accordingly, for example, after executing the text input to the input area 1010, the user can perform the drag & drop input of the image 1041 in addition to the text. Further, after executing the drag & drop input of the image 1041 on the input area 1010, the user may input the text in addition to the image.

(Search Button)

The search button 1020 is displayed in association with the input area 1010. In the example shown in the figure, the search button 1020 is placed near the left end of the input area 1010. In the present embodiment, the search button 1020 is a first icon for executing a first operation based on an input accepted by the input area 1010. For example, when the user presses the search button 1020 through the touch sensor 114 or a mouse, the browser function 124 executes information search on a network using as a condition the input accepted by the input area 1010. In this case, the browser function 124 transmits a request including the input accepted by the input area 1010 to a server providing an information search service, and receives information of search results as a response to the request from the server. The information of search results may be displayed in the information display area 1040 as will be described below.

(Post Button)

The post button 1030 is also displayed in association with the input area 1010 in the same manner as the search button 1020. In the example shown in the figure, the post button 1030 is placed near the right end of the input area 1010. In the present embodiment, the post button 1030 is a second icon for executing a second operation, which is different from the first operation, based on an input accepted by the input area 1010. For example, when the user presses the post button 1030 through the touch sensor 114 or a mouse, the browser function 124 posts the input accepted by the input area 1010 on social media. In this case, the browser function 124 transmits a request including the input accepted by the input area 1010 to a server providing the social media, and receives from the server, as a response to the request, information indicating a state of the social media after the posted comment is reflected, that is, information of a time line display of the posted comments or a news feed. The received information may be displayed in the information display area 1040 as will be described below.

(Information Display Area)

The information display area 1040 is displayed within the screen 1000 in which the input area 1010, the search button 1020, and the post button 1030 are displayed. In the example shown in the figure, the information display area 1040 includes two display areas 1040a and 1040b which are separated from each other. The display area 1040a is a first display area which displays information of search results acquired by the information search executed at the time of pressing the search button 1020. Further, the display area 1040b is a second display area which displays information of social media acquired by the posting executed at the time of pressing the post button 1030.

Here, the display of the display area 1040a may be independent of the display of the display area 1040b. For example, when the search button 1020 is pressed, the display area 1040a is updated, and when the post button 1030 is pressed, the display area 1040b is updated. In this manner, the two display areas 1040a and 1040b may be updated alternately. Note that, in the present embodiment, since the order of pressing the search button 1020 and the post button 1030 is freely set, one of the display areas 1040a and 1040b may be updated successively.

1-3. Use Case

Hereinafter, with reference to FIGS. 3 to 11, use cases of the first embodiment of the present disclosure will be described. Note that the use cases to be described are merely examples, and there may be many other use cases. That is, the use cases to be described do not limit the configuration and the operation of the present embodiment.

(First Use Case)

Figure 3:
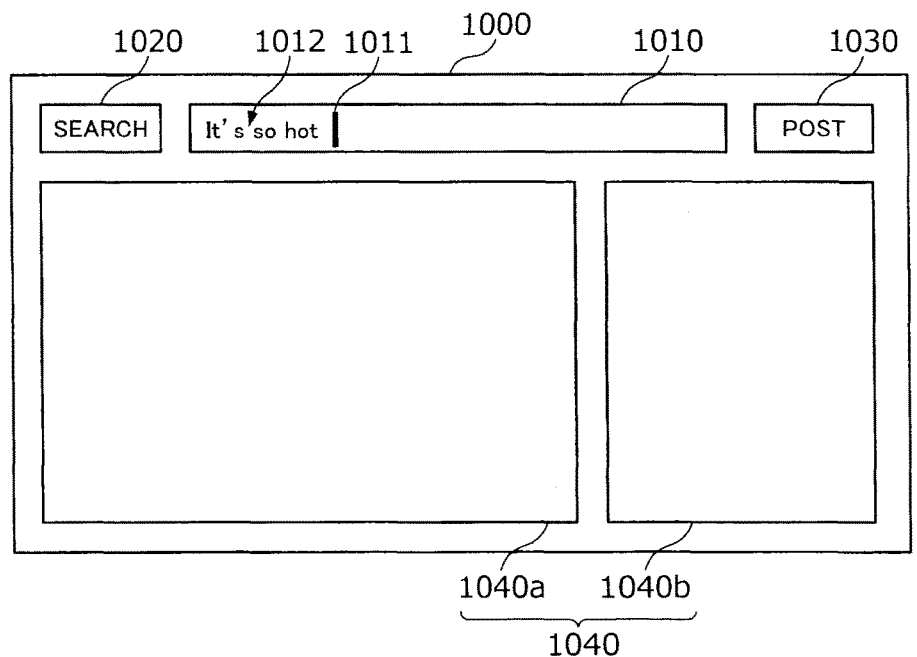
FIG. 3 is a diagram illustrating a use case according to the first embodiment of the present disclosure.

FIG. 3 is a diagram showing a state in which a user executes a text input to the input area 1010 in an initial state of the screen 1000. In this state, a text 1012 input by the user is displayed in the input area 1010. Since the search button 1020 and the post button 1030 are not pressed yet, the display areas 1040a and 1040b are blank. Note that, as another example, initial images that are set in advance, such as search services and front pages of social media, may be displayed in the display areas 1040a and 1040b.

Figure 4:
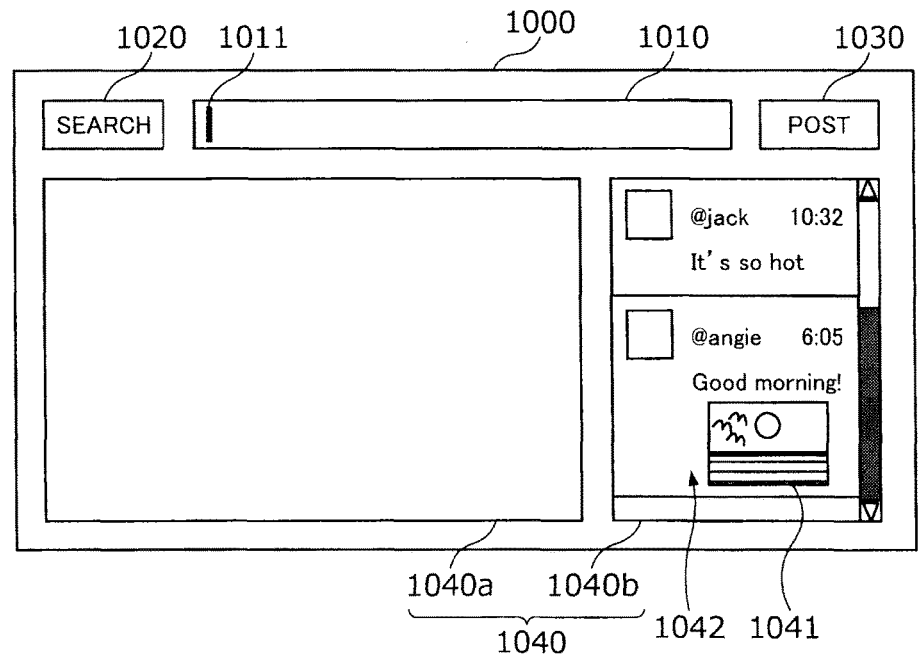
FIG. 4 is a diagram illustrating a use case according to the first embodiment of the present disclosure.

FIG. 4 is a diagram showing a state in which the user presses the post button 1030 in the state shown in FIG. 3. In this state, the text 1012 displayed in the input area 1010 may be deleted since the comment has been posted (may also be displayed continuously). In the display area 1040b, a time line 1042 of comments posted on the social media after the text 1012 has been posted is displayed.

FIG. 5 is a diagram showing a state in which the user performs a drag & drop operation on the image 1041 displayed on the time line 1042 to the input area 1010 in the state shown in FIG. 4. In this state, an image 1013 corresponding to the image on which the user has performed the drag & drop operation is displayed in the input area 1010. Note that the image 1013 is a reduced image of the image 1041. The display state of the information display area 1040 is the same as the state shown in FIG. 4.

In this case, for example, when the drag operation on the image 1041 is started, the browser function 124 acquires a link set in the image 1041 and a uniform resource locator (URL) of a source, and generates the image 1013 using the image acquired by the URL as a source. In addition, when the drag operation on the image 1041 is finished in the input area 1010, the browser function 124 causes the input area 1010 to display the image 1013, and internally retains the acquired URL for a search or posting to be performed afterward.

FIG. 6 is a diagram showing a state in which the user presses the search button 1020 in the state shown in FIG. 5. When the search button 1020 is pressed, the browser function 124 transmits to a server the URL of the image 1041 as a search condition, for example, and thus executes information search using the image 1041 as a condition. In this state, the image 1041 may be displayed continuously in (or may be deleted from) the input area 1010. In the display area 1040a, information search results 1043 obtained by using the image 1041 as a condition are displayed. The information search results 1043 may include preview images of the search results, links to the search results, and the like. On the other hand, in the display area 1040b, the time line 1042 of social media displayed in the state shown in FIG. 4 is displayed continuously.

Figure 7:
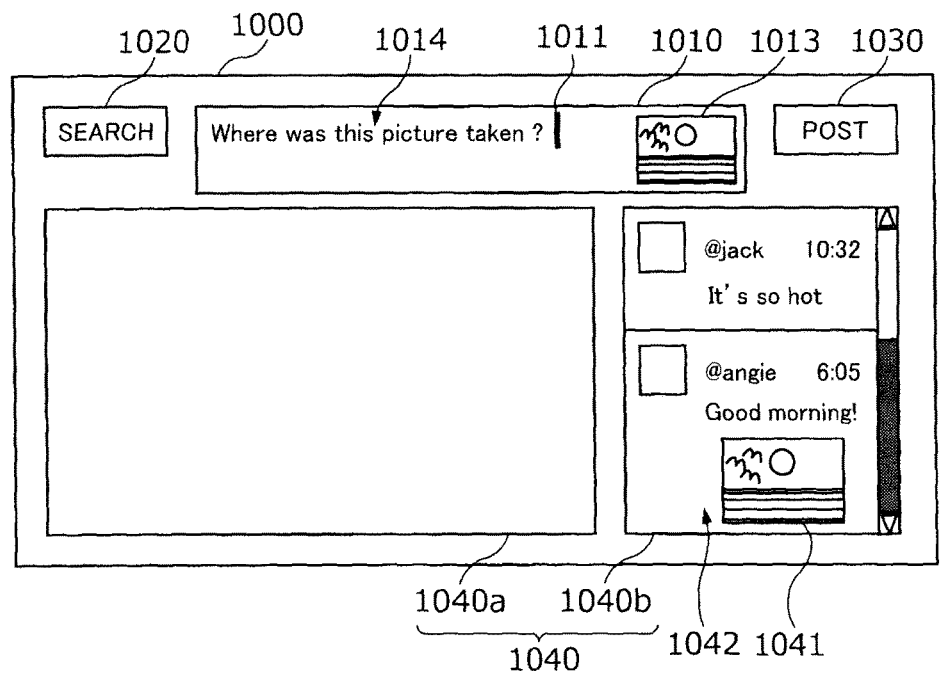
FIG. 7 is a diagram illustrating a use case according to the first embodiment of the present disclosure.

FIG. 7 is a diagram showing a state in which the user further executes a text input to the input area 1010 in the state shown in FIG. 5. Note that the state shown in FIG. 7 and the state shown in FIG. 6 are parallel to each other. In this state, the input area 1010 includes the image 1013 that is displayed based on the drag & drop input performed by the user and a text 1014 displayed based on the text input that is performed afterward. The display state of the information display area 1040 is the same as the state shown in FIG. 4.

Figure 8:
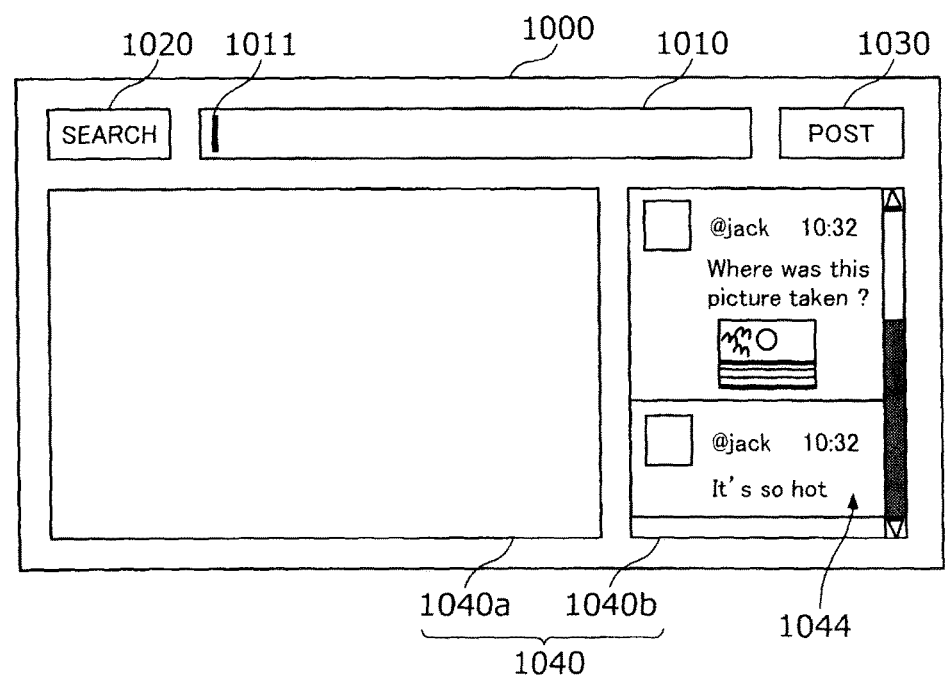
FIG. 8 is a diagram illustrating a use case according to the first embodiment of the present disclosure.

FIG. 8 is a diagram showing a state in which the user presses the post button 1030 in the state shown in FIG. 7. When the post button 1030 is pressed, the browser function 124 transmits, to the server, the URL of the image 1041 that is the source of the image 1013 in addition to the text 1014 that is input to the input area 1010, and thus can post the text and the image 1041 on the social media. In this state, the image 1013 and the text 1014 displayed in the input area 1010 may be deleted since the posting has been executed (or may be displayed continuously). The display of the display area 1040*b* is replaced with a time line 1044 of the social media after the image 1041 and the text 1014 have been posted.

(Second Use Case)

Figure 9:
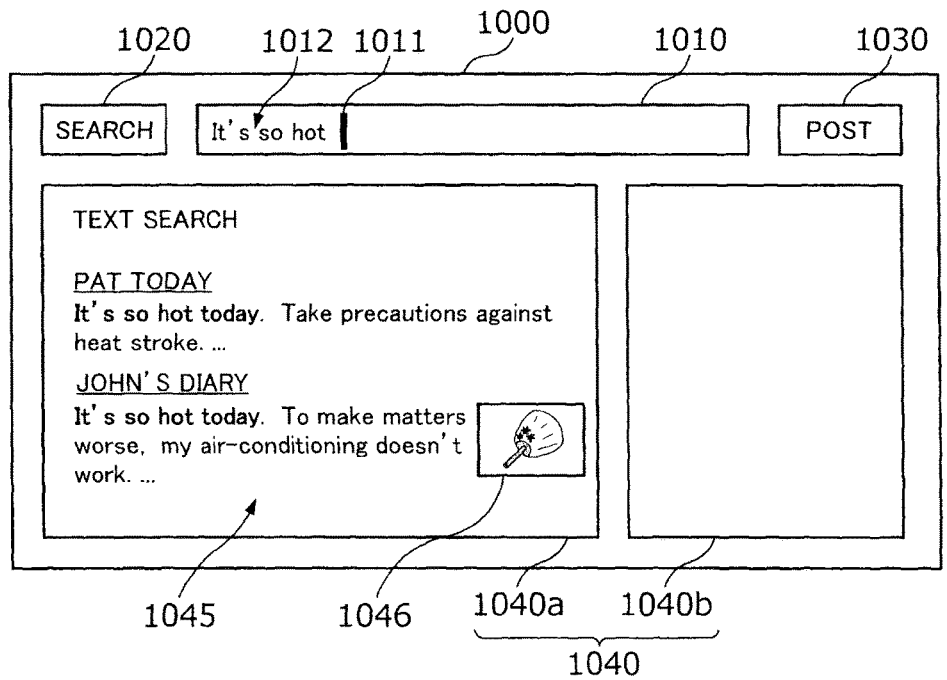
FIG. 9 is a diagram illustrating a use case according to the first embodiment of the present disclosure.

FIG. 9 is a diagram showing a state in which the user presses the search button 1020 in the state shown in FIG. 3. In this state, the text 1012 may be displayed continuously in (or may be deleted from) the input area 1010. In the display area 1040*a*, information search results 1045 obtained by using the text 1012 as a condition are displayed.

Figure 10:
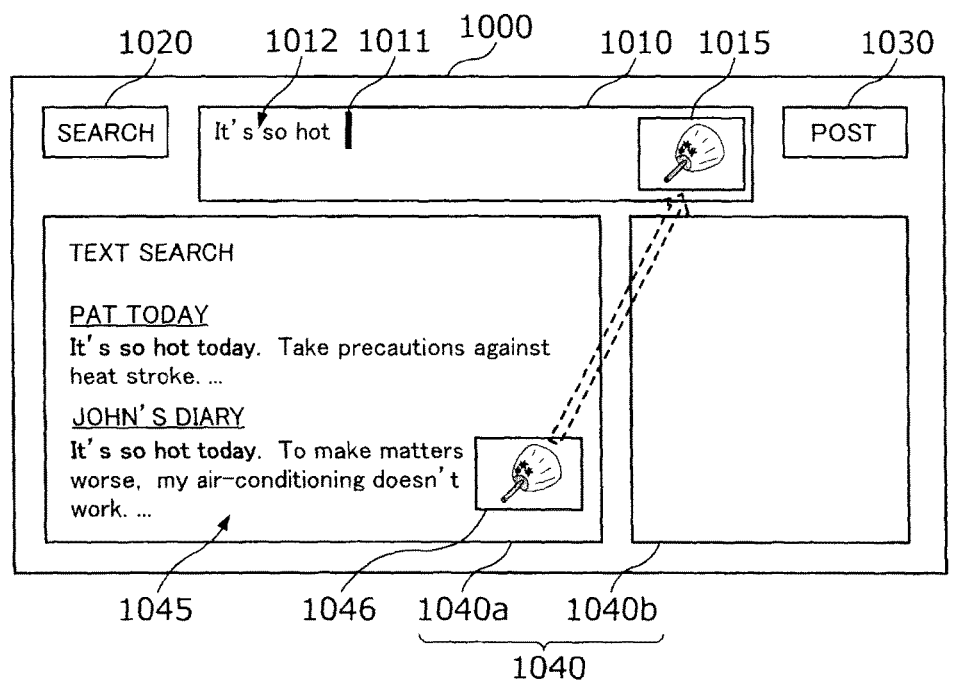
FIG. 10 is a diagram illustrating a use case according to the first embodiment of the present disclosure.

FIG. 10 is a diagram showing a state in which the user performs a drag & drop operation on an image 1046 displayed in the information search results 1045 to the input area 1010 in the state shown in FIG. 9. In this state, an image 1015 corresponding to the image on which the user has performed the drag & drop operation is displayed in the input area 1010 in addition to the text 1012 that has already been displayed. The display state of the information display area 1040 is the same as the state shown in FIG. 9.

Figure 11:
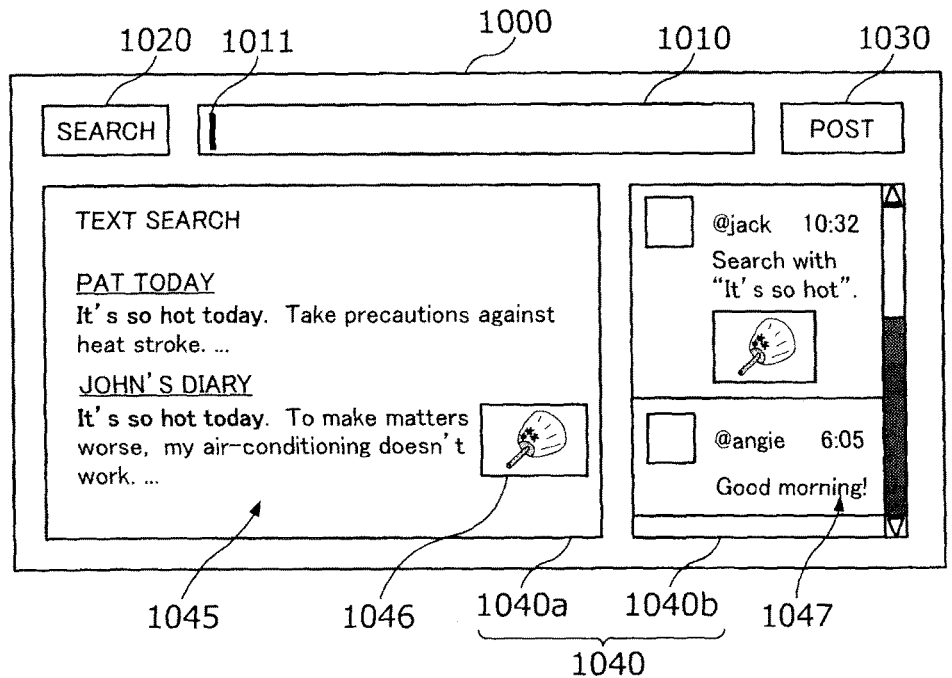
FIG. 11 is a diagram illustrating a use case according to the first embodiment of the present disclosure.

FIG. 11 is a diagram showing a state in which the user presses the post button 1030 in the state shown in FIG. 10. In this state, the text 1012 and the image 1015 displayed in the input area 1010 may be deleted since the posting has been executed (or may be displayed continuously). In the display area 1040*b*, a time line 1047 of comments posted on the social media after the text 1012 and the image 1046 have been posted is displayed. On the other hand, in the display area 1040*a*, the information search results 1045 displayed in the state shown in FIG. 9 is displayed continuously.

Here, as the example shown in the figure, the browser function 124 may automatically process the text 1012 (It's so hot) that is used as a condition for the last information search in a manner that the text 1012 (It's so hot) is recognized as a search condition, for example, "Search with "It's so hot"", and then may post the processed text 1012 on the social media. Whether to process the text 1012 may be determined on the basis of, for example, whether the information search is executed immediately before the posting, and whether the text used as a condition for the information search matches the posted text.

SUMMARY

In the first embodiment of the present disclosure described above, displayed on the screen 1000 are the input area 1010 which accepts the text input or the drag & drop input performed by the user, the search button 1020, and the post button 1030, the search button 1020 and the post button 1030 being associated with the input area 1010. The first operation executed by the pressing of the search button 1020 is the information search on a network, and the second operation executed by the pressing of the post button 1030 is the posting on social media. In both operations, the inputs accepted in the input area 1010 are utilized.

In this way, since multiple functional icons for achieving operations different from each other are displayed in association with a common input area, the user can cause multiple operations to be executed on the basis of an input to a single input area. For example, after pressing the search button 1020 and executing information search, the user additionally inputs an image or the like included in search results to the input area 1010 and then presses the post button 1030, and can thereby share easily the search results on the social media. Further, for example, after pressing the post button 1030 and executing posting on the social media, the user additionally inputs an image or the like included in a time line of the social media to the input area 1010 and then presses the search button 1020, and can thereby search information on the networks related to the image or the like included in posted comments of other users displayed in the time line.

Further, in the present embodiment, displayed in the information display area 1040 of the screen 1000 are the display area 1040*a* which displays information acquired by the information search and the display area 1040*b* which displays information acquired by the posting on the social media, and the display area 1040*a* and the display area 1040*b* are displayed as areas separated from each other. In this way, the user can simultaneously see the results of the information search and the results of the posting on the social media, and thus, it becomes easy for the user to utilize cross-sectionally the respective pieces of information. For example, even after executing information search by successively pressing several times the search button 1020, the user can see the previous state of the social media through the display area 1040*b*, and thus, it becomes easy to post appropriate information on the social media.

2. Second Embodiment

Next, with reference to FIG. 12 and FIG. 13, a second embodiment of the present disclosure will be described. The present embodiment and the first embodiment differ from each other in the layout of the screen, but are the same in other parts, and hence, the descriptions on those parts are omitted.

Figure 12:
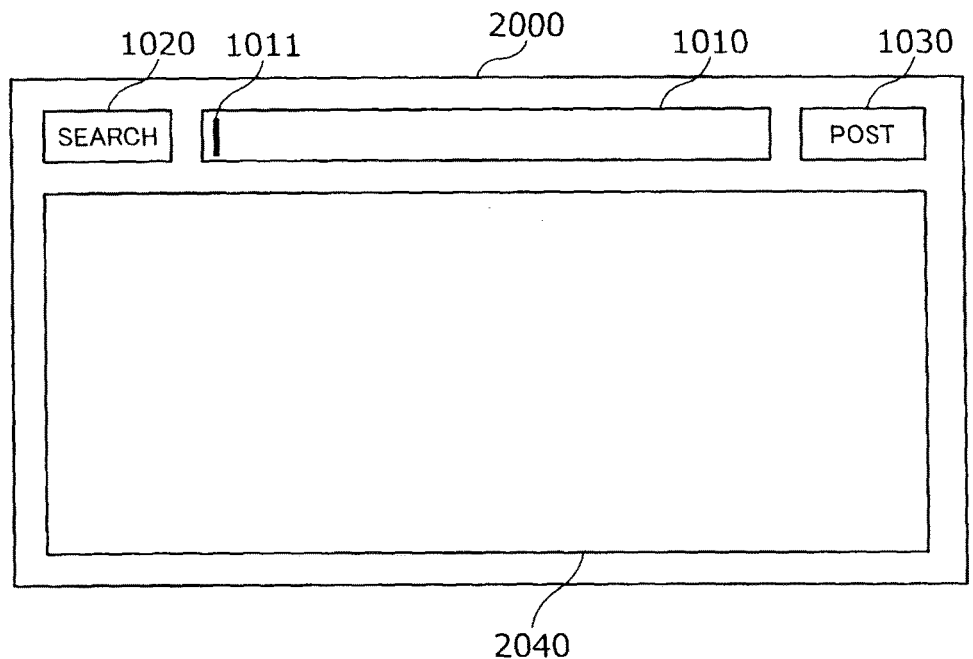
FIG. 12 is a diagram showing an example of a screen shown on a display in a second embodiment of the present disclosure.

FIG. 12 is a diagram showing an example of a screen shown on a display in the second embodiment of the present disclosure. Referring to FIG. 12, a screen 2000 shown on a display 112 of a terminal device 100 includes an input area 1010, a search button 1020, a post button 1030, and an information display area 2040. Hereinafter, the information display area 2040, which is different from the first embodiment, will be further described.

The information display area 2040 is displayed within the screen 2000 in which the input area 1010, the search button 1020, and the post button 1030 are displayed. As a difference between the information display area 2040 and the information display area 1040 according to the first embodiment, the information display area 2040 has a single display area. The information display area 2040 displays one of the followings which is acquired last: search results acquired by the information search executed at the time of pressing the search button 1020; and information of social media acquired by the posting executed at the time of pressing the post button 1030. That is, in the present embodiment, the display area of the information search results and the display area of information of the social media are displayed alternately in the common area.

As described in the first embodiment, it is advantageous to cause the information search results and the information of the social media to be displayed in areas separated from each other in order to utilize cross-sectionally the respective pieces of information. However, for example, in the case where the size of the screen 2000 is limited or in the case where there is an attempt to ensure as much space for the display area of each piece of information as possible, it may be advantageous, as described in the present embodiment, to display the information search results and the information of the social media alternately in the common area.

Figure 13:
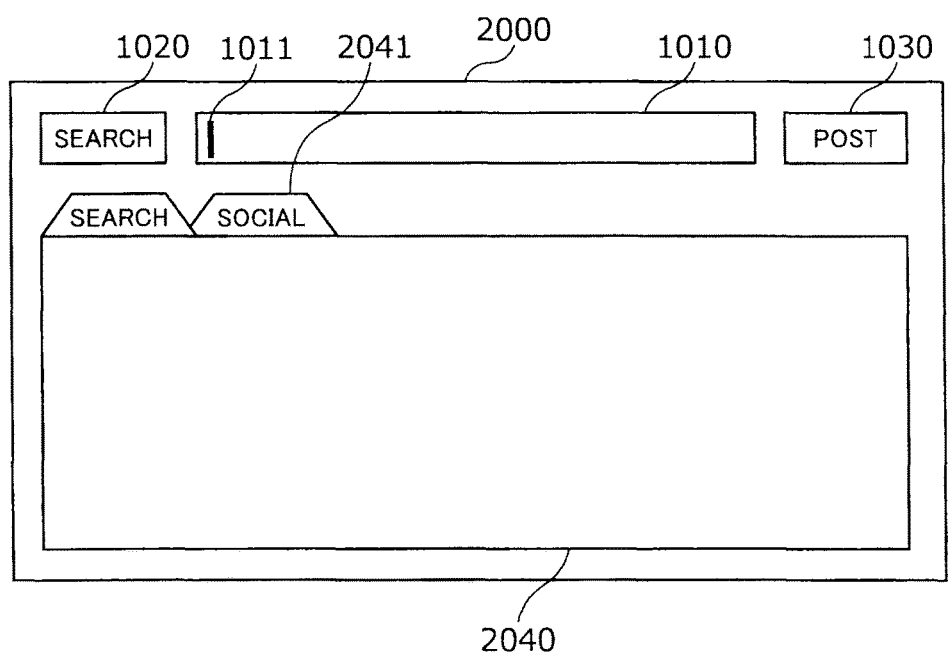
FIG. 13 is a diagram showing an example of a screen shown on a display in a modified example of the second embodiment of the present disclosure.

FIG. 13 is a diagram showing an example of a screen shown on a display in a modified example of the second embodiment of the present disclosure. Referring to FIG. 13, a screen 2000, which is the same as the screen 2000 described with reference to FIG. 12, displays a tab 2041 in association with the information display area 2040. With the tab 2041, the display of the information display area 2040 can be switched between the last information search results and the last piece of information of the social media. With the display of the tab 2041 in this manner, even in the case of displaying the information search results and the information of the social media in the common area, it becomes easy to utilize cross-sectionally the respective pieces of information.

3. Third Embodiment

Next, with reference to FIG. 14 and FIG. 15, a third embodiment of the present disclosure will be described. The present embodiment and the first embodiment differ from each other in the operation of the browser function 124 at the time of performing a drag & drop operation in the screen 1000, but are the same in other parts, and hence, the descriptions on those parts are omitted. Note that "object" written in the description below corresponds to each of the images 1041 and 1046 in the use cases shown in the first embodiment.

(At Time of Executing Drag & Drop Operation)

FIG. 14 is a flowchart showing an example of processing performed by the browser function 124 at a time of executing a drag & drop operation in the third embodiment of the present disclosure. In the example shown in the figure, first, the browser function 124 detects that a drag operation is started through the touch sensor 114, a mouse, or the like (Step S101). In this case, the browser function 124 acquires information about an object displayed at a start position of the drag operation from the display control function 122 (Step S103).

After that, the browser function 124 detects that a drop operation is executed through the touch sensor 114, the mouse, or the like (Step S105). Here, in the case where a drop position is within the input area 1010 (Step S107), the browser function 124 causes the input area 1010 to display an image showing the object (Step S109) and also detects a type of the object (Step S111).

Here, the type of the object may be an image, a sound, or a video, for example. The browser function 124 detects the type of the object on the basis of a file format of the object indicated by a link set in the object or a URL of a source. The browser function 124 internally retains the type of the object that has been detected (Step S113). Note that the information of the retained type of the object may be discarded in the case where the image showing the object displayed in the input area 1010 is deleted by a user operation (for example, Backspace or Delete) in the input area 1010.

(At Time of Pressing Search Button)

Figure 15A:
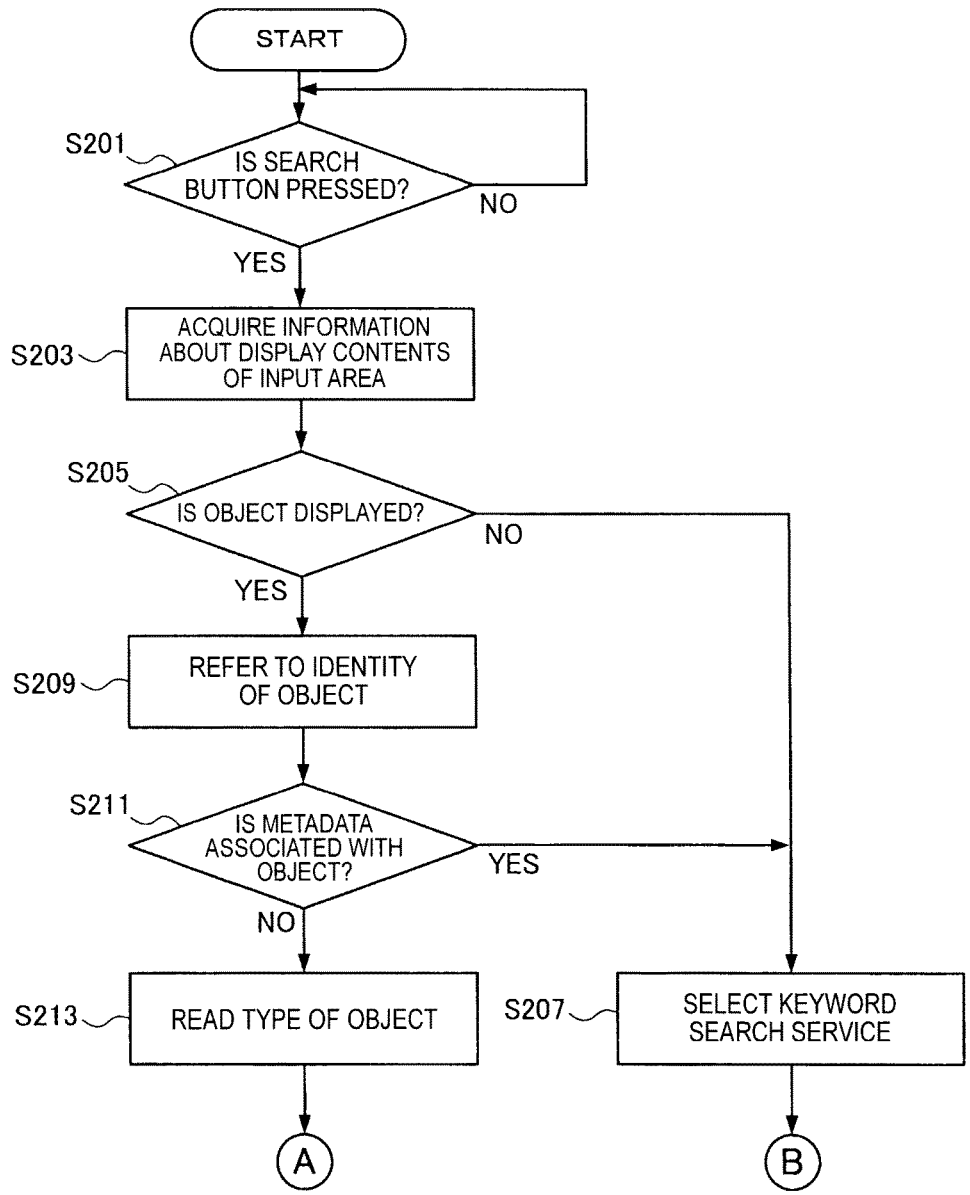
FIG. 15A is a flowchart showing an example of processing performed by a browser function at a time of pressing a search button in the third embodiment of the present disclosure.
Figure 15B:
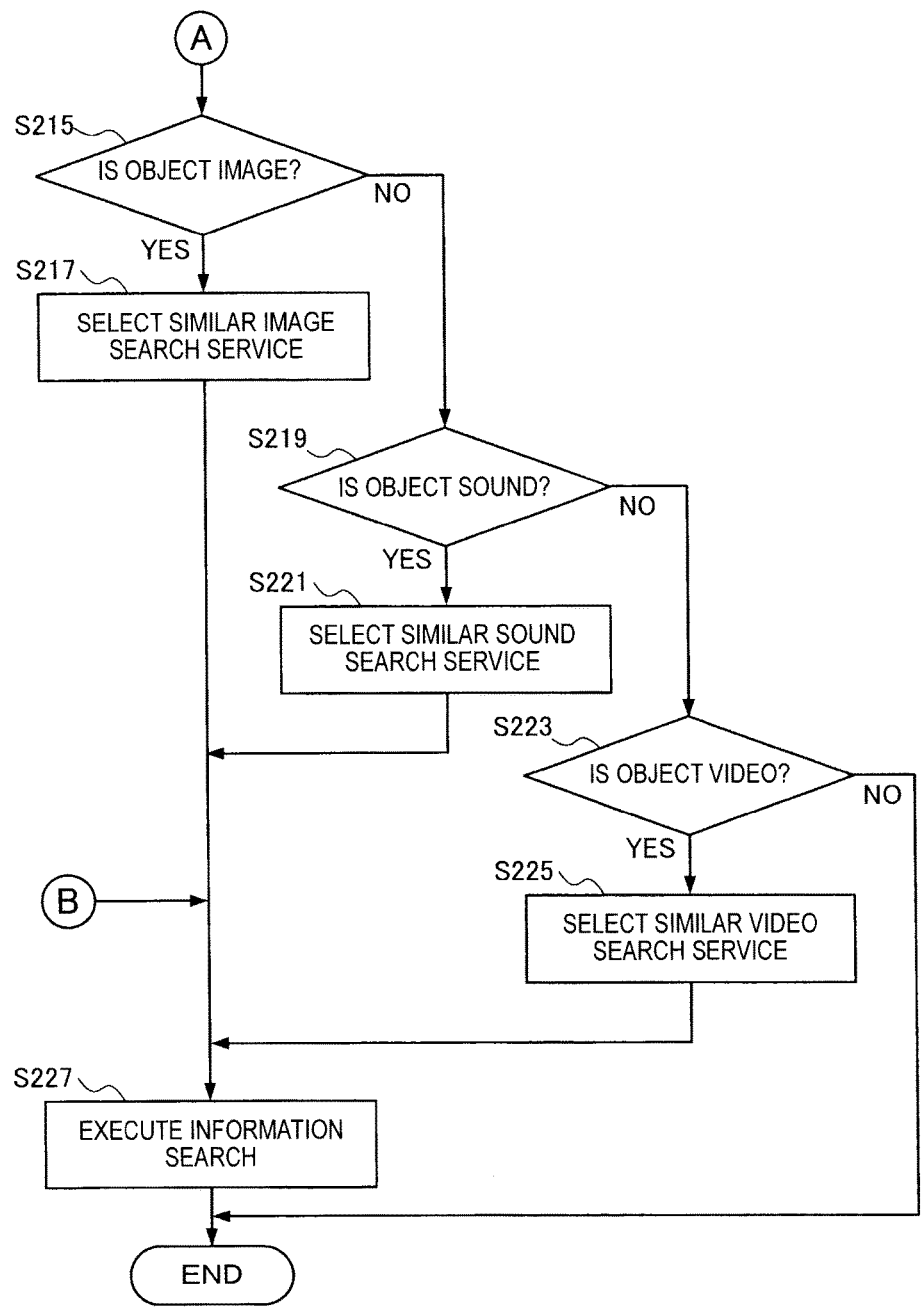
FIG. 15B is a flowchart showing the example of the processing performed by the browser function at the time of pressing the search button in the third embodiment of the present disclosure.

FIG. 15 (FIG. 15A and FIG. 15B) are flowcharts showing an example of processing performed by the browser function 124 at a time of pressing a search button in the third embodiment of the present disclosure. In the example shown in the figure, first, the browser function 124 detects that the search button 1020 is pressed through the touch sensor 114, a mouse, or the like (Step S201). In this case, the browser function 124 acquires information about display contents of the input area 1010 from the display control function 122 (Step S203).

Next, the browser function 124 selects an information search service on the basis of the display contents of the input area 1010. Here, first, the browser function 124 determines whether an object is displayed in the input area 1010 (Step S205). Here, if the object is not displayed, the browser function 124 selects a keyword search service (Step S207). On the other hand, in the case where the object is displayed, the browser function 124 selects the information search service based on a type or an attribute of the object. To be more specific, the browser function 124 refers to an identity of the object (Step S209), and determines whether metadata of a given type is associated with the object (Step S211).

Here, the metadata is additional text data associated with an image, sound, or video file, and may include, for example, information that is automatically generated such as date and time of file creation, date and time of file updating, or a file creator, and information that is explicitly added by the user such as a tag. The given metadata detected in Step S211 may be the information that is explicitly added such as a tag. In the case where it is determined in Step S211 that the given metadata is associated with the object, the browser function 124 selects the keyword search service in order to execute the search using the text of the metadata as a condition (Step S207).

On the other hand, in the case where it is determined in Step S211 that the given metadata is not associated with the object, in order to execute the search using the object itself as a condition, the browser function 124 reads the type of the object detected at the time of executing the drag & drop operation (Step S213), and selects the information search service on the basis of the type of the object. In the case where the type of the object is an image (Step S215), the browser function 124 selects a similar image search service (Step S217). In the case where the type of the object is a sound (Step S219), the browser function 124 selects a similar sound search service (Step S221). In the case where the type of the object is a video (Step S223), the browser function 124 selects a similar video search service (Step S225).

After selecting an appropriate search service through the above processing, the browser function 124 executes the information search (Step S227).

In the third embodiment of the present disclosure described above, since an appropriate search service can be selected for each type of object with respect to the object such as an image that is input to the input area 1010 through the drag & drop operation, it becomes easy to execute search processing using the input area 1010 with respect to diverse objects not limited to the image and including the sound and the video. Note that the present embodiment can be carried out in combination not only with the first embodiment, but also with the second embodiment.

As a modified example of the present embodiment, processing that is the same as the processing described with reference to FIG. 15 may also be executed at the time of pressing the post button 1030, and social media on which a comment has been posted may be selected. In this case, for example, different social media may be selected as a posting destination depending on whether the comment to be posted is a text, an image, a sound, or a video.

Further, as another modified example, multiple information search services may be selected. For example, in the case where a text and an image with which metadata is associated are input to the input area 1010, the browser function 124 may execute in parallel a keyword search using a text that has been input and a text indicated by metadata as conditions, and a similar image search.

4. Fourth Embodiment

Next, with reference to FIG. 16, a fourth embodiment of the present disclosure will be described. The present embodiment and the first embodiment differ from each other in the layout of the screen, but are the same in other parts, and hence, the descriptions on those parts are omitted.

Figure 16:
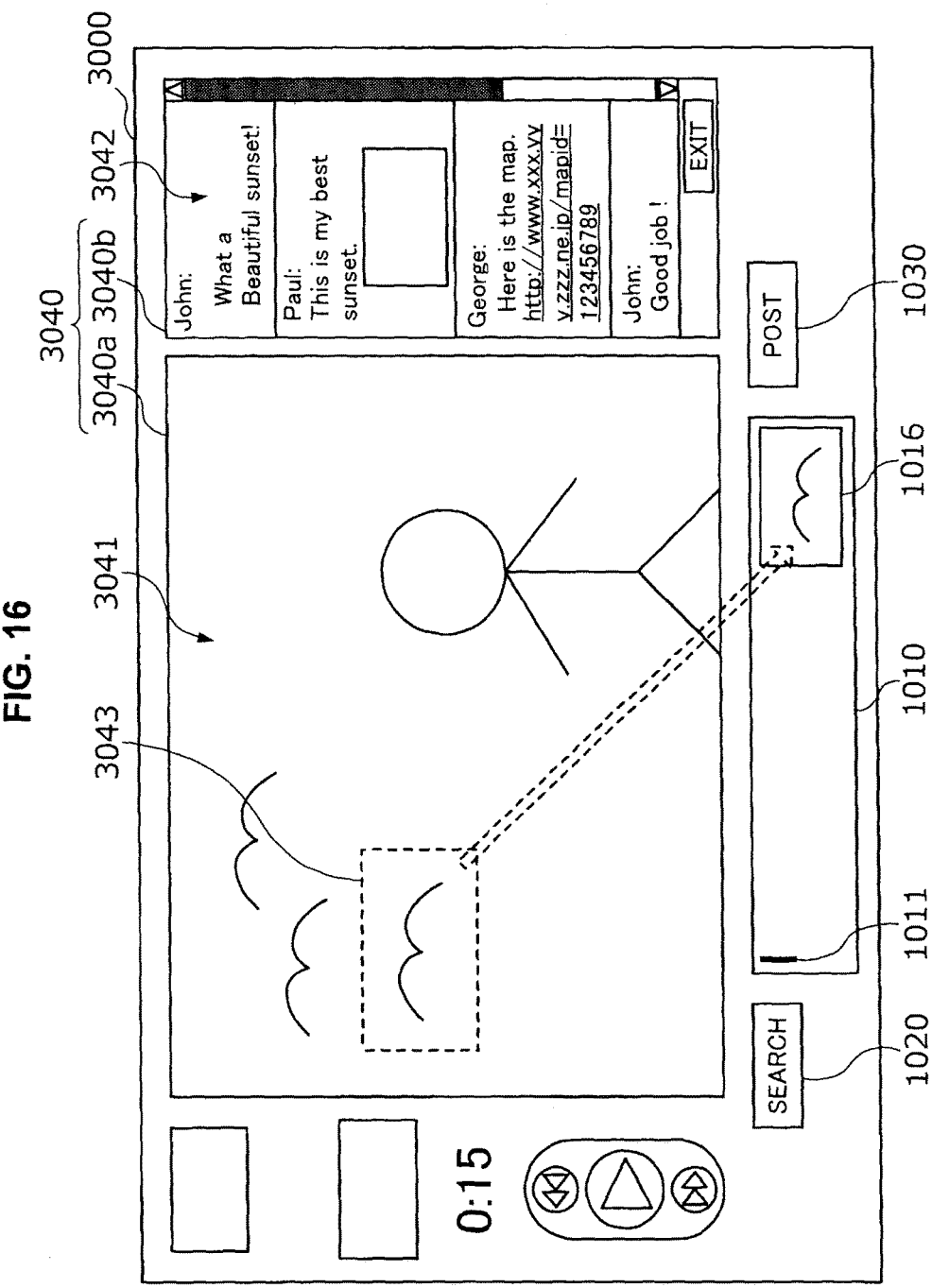
FIG. 16 is a diagram showing an example of a screen shown on a display in a fourth embodiment of the present disclosure.

FIG. 16 is a diagram showing an example of a screen shown on a display in the fourth embodiment of the present disclosure. Referring to FIG. 16, a screen 3000 shown on a display 112 of a terminal device 100 includes an input area 1010, a search button 1020, a post button 1030, and an information display area 3040. Hereinafter, the information display area 3040, which is different from the first embodiment, will be further described.

The information display area 3040 is displayed within the screen 3000 in which the input area 1010, the search button 1020, and the post button 1030 are displayed. In the example shown in the figure, two display areas 3040a and 3040b are displayed as the information display area 3040. The display area 3040b displays information of social media, in the same manner as the display area 1040b in the first embodiment. On the other hand, the display area 3040a displays information related to a content distribution service.

The content distribution service distributes, to a user, content such as video stored in a server on a network, for example. In the service, the user can search for content using a keyword, another related user, a genre, and the like. In the present embodiment, when the search button 1020 is pressed, the browser function 124 executes content search on the service on the basis of the input accepted by the input area 1010.

The results of the content search are displayed in the display area 3040a. The user can start viewing content from an icon or a link included in the displayed search results. The content image to be viewed is also displayed in the display area 3040a. Note that FIG. 16 shows a state in which a content image 3041 is displayed in the display area 3040a.

In addition, while viewing the content image 3041 displayed in the display area 3040a, the user can also enjoy communication with other users by using a time line 3042 of the social media displayed in the display area 3040b. It is also possible to post a captured image 3041 of content on the social media by utilizing the input area 1010.

In the example shown in the figure, a part of the content image 3041 displayed in the display area 3040a is cut out as a captured image 3043 through a drag & drop operation performed by the user, and is displayed as an image 1016 in the input area 1010. In this way, the user cuts out a specific person or object that appears in the content image as the captured image 3043, and can communicate with other users about the person or the object on the social media.

5. Supplement

In the embodiments described above, the display control function 122 and the browser function 124 have been achieved by the processor 120 of the terminal device 100, but embodiments of the present disclosure are not limited thereto. For example, one of or both of the display control function and the browser function may be achieved by a processor of an information processing apparatus that configures a server.

Further, in the embodiments described above, the search button 1020 and the post button 1030 are placed near the left end and near the right end of the input area 1010, respectively, but embodiments of the present disclosure are not limited thereto. The first icon and the second icon shown as examples of the search button 1020 and the post button 1030, respectively, may be displayed in association with the input area, and the positional relationship between the first and second icons and the input area may be any positional relationship. For example, the first and second icons may be displayed side by side at the left side, the right side, the upper side, or the bottom side of the input area. Note that, in the case where the first and second icons are placed near both ends of the input area, the difference between operations executed by the respective icons can be shown to the user intuitively, for example.

The embodiments of the present disclosure may include the information processing apparatus (terminal device or server), the system, the information processing method executed in the information processing apparatus or the system, the program for causing the information processing apparatus to function, and the non-transitory tangible media having the program recorded thereon, which have been described above, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including
a processor configured to cause a display to show a screen, the screen including
an input area which accepts a text input or a drag & drop input performed by a user,
a first icon which is associated with the input area and executes a first operation based on an input accepted by the input area,
a second icon which is associated with the input area and executes a second operation based on an input accepted by the input area, the second operation being different from the first operation,
a first display area for information acquired by the first operation, and
a second display area for information acquired by the second operation.

(2) The information processing apparatus according to (1), wherein the input area accepts a drag & drop input of an object displayed in the first display area or in the second display area.

13

(3) The information processing apparatus according to (2),
wherein the processor is further configured to execute the first operation in a different way in accordance with a type or an attribute of the object.
(4) The information processing apparatus according to (3),
wherein the processor is configured to execute the first operation in a different way in accordance with a file format of the object.
(5) The information processing apparatus according to (3) or (4),
wherein the processor is configured to execute the first operation in a different way in accordance with whether metadata of a given type is associated with the object.
(6) The information processing apparatus according to any one of (3) to (5),
wherein the first operation includes information search on a network using as a condition an input accepted by the input area, and
wherein the processor selects a different information search service in accordance with the type or the attribute of the object.
(7) The information processing apparatus according to any one of (1) to (6),
wherein the input area further accepts, successively to the text input or the drag & drop input, another one of the text input or the drag & drop input.
(8) The information processing apparatus according to (7),
wherein the input area accepts both the text input and the drag & drop input which are successive to each other.
(9) The information processing apparatus according to any one of (1) to (8),
wherein the first icon and the second icon are placed near both ends of the input area, respectively.
(10) The information processing apparatus according to any one of (1) to (9),
wherein the first display area and the second display area are displayed as areas separated from each other.
(11) The information processing apparatus according to any one of (1) to (9),
wherein the first display area and the second display area are displayed in a switchable manner in a common area.
(12) The information processing apparatus according to any one of (1) to (9),
wherein the first display area and the second display area are displayed alternately in a common area.
(13) The information processing apparatus according to any one of (1) to (12),
wherein the first operation includes information search on a network using as a condition an input accepted by the input area, and
wherein the second operation includes posting the input accepted by the input area on social media.
(14) An information processing method performed by a processor, the method including
causing a display to show a screen, the screen including
an input area which accepts a text input or a drag & drop input performed by a user,
a first icon which is associated with the input area and executes a first operation based on an input accepted by the input area,
a second icon which is associated with the input area and executes a second operation based on an input accepted by the input area, the second operation being different from the first operation,
a first display area for information acquired by the first operation, and

14 a second display area for information acquired by the second operation.

What is claimed is:
1. An information processing apparatus, comprising:
circuitry configured to
control a display to display a screen, the screen including an input area, a first icon and a second icon that are associated with the input area, a first display area associated with the first icon and a second display area associated with the second icon;
accept, through the input area, a text input or a multimedia object input;
execute a search operation in response to selection of the first icon based on the text input or the multimedia object input by transmitting a request to a first server;
display a search result of the search operation in the first display area and retain the text input or the multimedia object input in the input area upon receiving the search result from the first server;
accept, in the input area, a multimedia object through a drag and drop operation of the multimedia object from the search result of the search operation displayed in the first display area;
execute a post operation on social media of the multimedia object accepted in the input area through the drag and drop operation in response to selection of the second icon by transmitting a request to a second server;
display a result of the post operation, including the text input or the multimedia object input in the input area, in the second display area along with existing posts of other users and clear the input area upon receiving the result of the post operation from the second server,
wherein
the search result of the search operation in the first display area continues to be displayed with the displayed result of the posting operation in the second display area;
accept, in the input area, a second multimedia object through a drag and drop operation of the second multimedia object from the second display area;
execute a second search operation in response to selection of the first icon based on the second multimedia object by transmitting a request to the first server; and
display a second search result of the second search operation in the first display area.

2. The information processing apparatus according to claim 1, wherein the circuitry accepts, through the input area, a multimedia object being displayed in the first display area or in the second display area.

3. The information processing apparatus according to claim 2, wherein, when the multimedia object input is accepted through the input area, the circuitry is further configured to execute the search operation in a different way in accordance with a type or an attribute of the multimedia object.

4. The information processing apparatus according to claim 3, wherein, when the multimedia object input is accepted through the input area, the circuitry is configured to execute the search operation in a different way in accordance with a file format of the multimedia object.

5. The information processing apparatus according to claim 3, wherein, when the multimedia object input is accepted through the input area, the circuitry is configured to execute the search operation in a different way in accordance with whether metadata of a given type is associated with the multimedia object.

6. The information processing apparatus according to claim 3, wherein, when the multimedia object input is accepted through the input area,
the circuitry selects a different information search service in accordance with the type or the attribute of the multimedia object when executing the search operation.

7. The information processing apparatus according to claim 1, wherein the circuitry further accepts, through the input area successively to the multimedia object, another one of text input or multimedia object input.

8. The information processing apparatus according to claim 7, wherein the circuitry accepts both the text input and the multimedia object input which are successive to each other.

9. The information processing apparatus according to claim 1,
wherein the first icon and the second icon are placed near both ends of the input area, respectively.

10. The information processing apparatus according to claim 1,
wherein the first display area and the second display area are displayed as areas separated from each other.

11. The information processing apparatus according to claim 1,
wherein the first display area and the second display area are displayed in a switchable manner in a common area.

12. The information processing apparatus according to claim 1,
wherein the first display area and the second display area are displayed alternately in a common area.

13. An information processing method performed by an information processing apparatus including circuitry, the method comprising:
controlling, by the circuitry, a display to display a screen, the screen including an input area, a first icon and a second icon that are associated with the input area, a first display area associated with the first icon and a second display area associated with the second icon;
accepting, by the circuitry through the input area, a text input or a multimedia object input;
executing, by the circuitry, a search operation in response to selection of the first icon based on the text input or the multimedia object input by transmitting a request to a first server;
displaying, by the circuitry, a search result of the search operation in the first display area and retaining the text input or the multimedia object input in the input area upon receiving the search result from the first server;
accepting, by the circuitry, in the input area, a multimedia object through a drag and drop operation of the multimedia object from the search result of the search operation displayed in the first display area;
executing, by the circuitry, a post operation on social media of the multimedia object accepted in the input area through the drag and drop operation in response to selection of the second icon by transmitting a request to a second server;
displaying, by the circuitry, a result of the post operation, including the text input or the multimedia object input in the input area, in the second display area along with existing posts of other users and clearing the input area upon receiving the result of the post operation from the second server,
wherein
the search result of the search operation in the first display area continues to be displayed with the displayed result of the posting operation in the second display area;
accepting, in the input area, a second multimedia object through a drag and drop operation of the second multimedia object from the second display area;
executing a second search operation in response to selection of the first icon based on the second multimedia object by transmitting a request to the first server; and
displaying a second search result of the second search operation in the first display area.

14. The information processing apparatus according to claim 1, wherein
the circuitry is further configured to extract a source address from the multimedia object and to include the extracted source address in the request transmitted to the second server, and
the source address is a uniform resource locator (URL) of the multimedia object.

15. The information processing apparatus according to claim 14, wherein
the circuitry is further configured to acquire a reduced-size image corresponding to the multimedia object by accessing the extracted source address and display the reduce-sized image in the input area.

16. The information processing method according to claim 13, wherein
the method further comprises extracting a source address from the multimedia object and including the extracted source address in the request transmitted to the second server, and
the source address is a uniform resource locator (URL) of the multimedia object.

17. The information processing method according to claim 16, further comprising:
acquiring, by the circuitry, a reduced-size image corresponding to the multimedia object by accessing to the extracted source address; and
displaying, by the circuitry, the reduce-sized image in the input area.

* * * * *